March 6, 1934.   G. PEDRAZZO   1,949,809
ALTERNATING ELECTRIC CURRENT STATIC TRANSFORMER
Original Filed June 4, 1929   2 Sheets-Sheet 1

Inventor:
G. Pedrazzo
By E. F. Wendcroft
Atty

March 6, 1934.   G. PEDRAZZO   1,949,809

ALTERNATING ELECTRIC CURRENT STATIC TRANSFORMER

Original Filed June 4, 1929   2 Sheets-Sheet 2

Inventor:
G. Pedrazzo
By E. F. Wenderoth
Atty

Patented Mar. 6, 1934

1,949,809

UNITED STATES PATENT OFFICE 1,949,809

ALTERNATING ELECTRIC CURRENT STATIC TRANSFORMER

Giovanni Pedrazzo, Biella, Italy

Original application June 4, 1929, Serial No. 368,254. Divided and this application July 1, 1931, Serial No. 548,271. In Italy June 12, 1928

5 Claims. (Cl. 171—119)

It is a known expedient, in the case of a three-phase transformer, to change both the high-voltage winding and the low-voltage winding from the usual delta connection to the usual star connection, thereby obtaining with the star connection a useful range of power output, with increased efficiency and with increased power factor, for electrical loads from say twenty to thirty-three per. cent of the maximum full-load power output of the transformer in delta connection. However, a single power range of such limited scope was not sufficient for practical and economic requirements.

It has already been proposed to adapt the characteristics of a transformer to changes in the load, by constructing the high-voltage winding and the low-voltage winding of groups of coils adapted to be connected in various ways to the supply line and to the load circuit. Such coils were to be used in series for light loads, and in parallel for heavier loads; in the case of three-phase transformers, mixed connections have also been provided for loads intermediate between the full loads for which the delta connection is adapted and the light loads for which the star connection is adapted. It has also been proposed to construct a single-phase transformer with a high-voltage winding and with a low-voltage winding, each of them composed of several conductors insulated from each other and disposed in a single cable; the said conductors could be connected with each other in series, in parallel, or in series-parallel.

All these propositions have been found inadequate in practice, either because of additional losses which accompany the change of the connections, or because of other difficulties among which may be mentioned the fact that the above-mentioned changes of the connections of the windings, known in the prior art, produce relatively extreme changes in the characteristics of the transformer and consequently do not provide the maximum desirable operating qualities, including (for example) efficiency, power factor, and regulation, for important intermediate ranges of load. For example, the change of connections of the windings of a three-phase transformer from delta to star provides for the maintenance, for loads of one-third of rated full load and less, of values of the desirable operating qualities which are higher than the values attainable with the same transformer arranged for operation in delta connection only. This method of changing the connections, however, makes no provision for improved values of operating qualities throughout the range between one-third of full load and values somewhat below full load.

An object of my invention is to remove this limitation existing in the prior art, by providing new and useful methods of changing the connections of the windings of a transformer whereby its characteristics may be varied in such a way as to adapt it to function with maximum values of the above-mentioned operating qualities over any desired range of load comprised between full load and the minimum load at which the transformer is operated in practice.

A transformer made according to my invention comprises a plurality of independently wound high-voltage windings and a plurality of independently wound low-voltage windings, all of the windings, both high-voltage and low-voltage, being disposed in the same manner with respect to the magnetic circuit of the transformer, the plurality of high-voltage windings and the plurality of low-voltage windings each being composed of a main winding and of one or more minor windings, in order to employ, in each plurality of windings for each phase, 1. the main winding alone; or 2. the main winding in series with one of the minor windings; or 3. the main winding in series with two or more of the several minor windings; which procedures make it possible to obtain, in addition to the usual range of power output, any desired number of other ranges of power output from the transformer, of values arbitrarily chosen and with efficient operation for each of these power ranges; this object being attained because of the fact that by the new and useful methods of employing the windings, herein disclosed, the magnetic flux is kept accurately adapted to the load, and furthermore because of the fact that the absence of parallel connections and of mixed connections of the windings, used in the prior art to obtain the aforesaid limited number of ranges of power output from the transformer in addition to its usual range of power output, avoids the additional iron losses and additional eddy-current losses in the copper of the transformer, these two forms of additional losses constituting serious drawbacks of the prior art.

In a transformer, with the windings employed in accordance with my invention, the plurality of windings in each phase will preferably be permanently connected in series. The connections in the plurality of windings in each phase, between the main winding and the minor winding if only one minor winding is used; (or if two or more minor windings are used, between the main winding and the adjacent ("first") minor winding and between the first minor winding and the other minor windings), are provided with taps leading to two devices adapted for effecting, in the plurality of windings of each phase of the transformer, the insertion of one or more minor windings into the path of the current of the main winding, and also, on occasion, in the case of a three-phase transformer, for effecting the well-known change from star connection to delta connection and vice versa. The insertion or the removal of one or more minor windings, and also, on occasion, in the case of a three-phase transformer, the change of connection from star to delta and vice versa, are obtained preferably by means of two controllers connected mechanically or otherwise so as to operate simultaneously.

As already pointed out, the practical and economic advantages which are obtained in a transformer, in employing the winding in accordance with my invention, are dependent on the fact that in obtaining any desired range of power output as well as the usual rated power output of the transformer, the undesirable parallel connections, or the series-parallel connections, or, (in the case of a three-phase transformer) the mixed connections (connections in double-star or in double-delta) are avoided, so that the increase of iron loss and the increase of eddy-current loss in the copper of the transformer, which attend these procedures used in the prior art, are avoided. Moreover, a transformer may be constructed in accordance with my invention with any number of ranges of power output, each such power range being chosen so as to adapt the transformer advantageously to the desired one or more ranges of loads; for example, ranges covering the interval between twenty per cent and eighty per cent of the usual rated power output of the transformer; these new and useful results of my invention resulting from the fact that the intensity of magnetization in the iron of the transformer may be kept accurately adapted to the load.

The following description, taken with reference to the accompanying drawings, concerns particularly a three-phase transformer in which the plurality of windings of each phase of the transformer comprises a main winding and one or more minor windings, but the invention is not limited to three-phase transformers but comprises also single-phase, two-phase or other polyphase transformers, in all of which forms each plurality of windings for each phase comprises a main winding and one or more minor windings, for use as indicated above.

In these drawings, which are given solely by way of example:—

Figure 3:
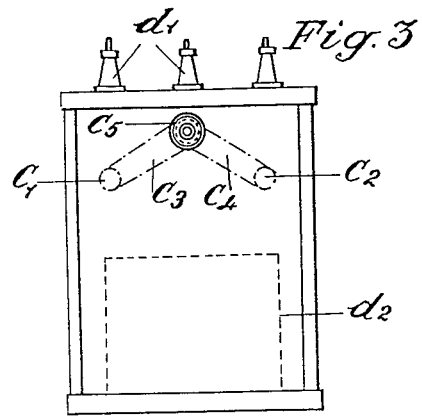

Fig. 3 shows semi-diagrammatically an apparatus, comprising two controllers mechanically interconnected for simultaneously changing the connections of the windings of the transformer in accordance with my invention; while Figs. 4–8 show diagrammatically, in accordance with my invention, various changes in the connections of typical three-phase groups of windings. Each of these figures shows only one of the two sets of windings pertaining to a three-phase transformer, that is, either the high-voltage set or the low-voltage set; and it is to be understood that in each case the number and kind of windings in the other set, and the changes in their connections, conform to those shown.

Figure 1:
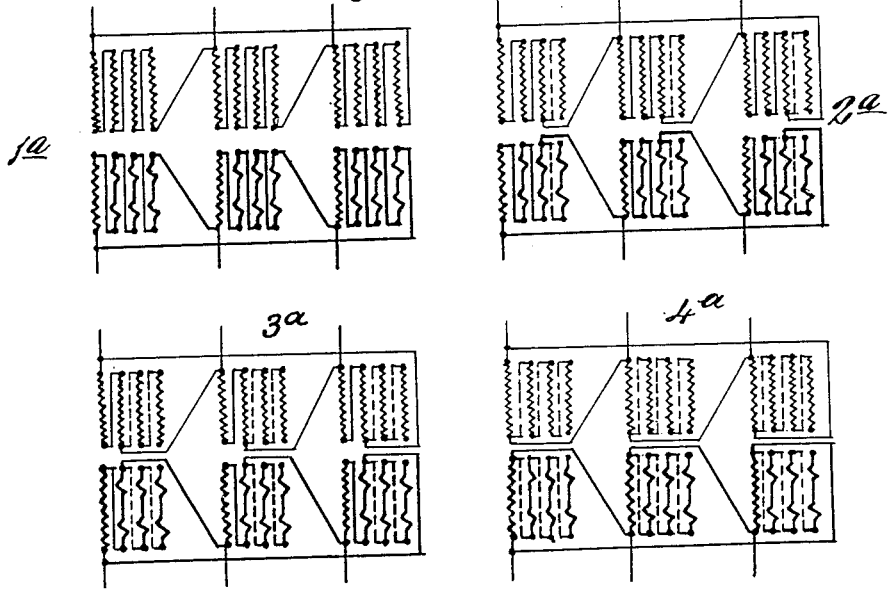
Fig. 1 shows diagrammatically a plurality of high-voltage windings and a plurality of low-voltage windings of a three-phase transformer, each of the six phase windings shown comprising a main winding and three minor windings.

In each detail ($1^a$, $2^a$, $3^a$ and $4^a$) of Fig. 1 the high-voltage windings of the transformer are shown in thin lines and the low-voltage windings are shown in thick lines. In each said detail, in the high-voltage windings as well as in the low-voltage windings, the main winding of each phase is shown on the left and the three minor windings of each phase are shown successively on the right. In the said details the connections shown in full lines, in each phase of both sets of windings, indicate the insertion of the minor winding or windings into the path of the current of the main winding. In the said details the connections shown in broken lines, in each phase of both sets of windings, indicate the removal of the minor winding or windings from the path of the current of the main winding. In order to obtain three different ranges of power output from a transformer, as well as its usual rated power output corresponding to condition $4^a$, the windings are connected as shown at $1^a$, $2^a$, $3^a$ and $4^a$.

Figure 2:
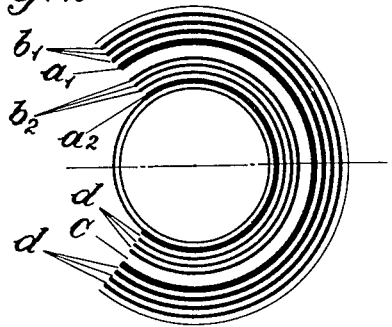
Fig. 2 shows diagrammatically, as an example, one end of a bundle of iron plates forming the core of a transformer and provided with primary and secondary windings as shown diagrammatically in Fig. 1.

Fig. 2 shows diagrammatically some constructional details of a typical arrangement of windings to be used in a transformer in accordance with my invention. The high-voltage windings comprise a main winding $a_1$ and three separate minor windings $b_1$, all wound over the whole length of a bundle of iron plates which constitutes the core of a transformer. The low voltage windings comprise a main winding $a_2$ and three separate minor windings $b_2$, all wound over the whole length of the aforesaid core. An insulating tube $c$ separates the high-voltage windings from the low-voltage windings. Insulating layers $d$ are located between the main winding and the minor windings, both of the high-voltage windings and also of the low-voltage windings.

The various changes of connections of the main windings and the minor windings, for each phase and for the high-voltage windings as well as the low-voltage windings, and including the well-known change from star connection to delta connection, in order to obtain the various ranges of power output from the transformer, may be carried out by any suitable means, as will be apparent to anyone skilled in the art; for example, by means of contact bridges, or by means of two suitable controllers which are constructed to make identical changes of the connections simultaneously in each phase of the high-voltage windings and of the low-voltage windings. An example of such a controller is shown semi-diagrammatically in Fig. 3, in which $c_1$ and $c_2$ indicate two controller drums which are mechanically interconnected and connected to the common operating shaft $c_5$ by chain belts $c_3$ and $c_4$ running over sprockets keyed to the shafts of the controller drums. It is evident that the mechanical interconnection of $c_1$, $c_2$ and $c_5$ could be effected by means of gearing. In Fig. 2 the two controllers and the operating shaft are assumed to be mounted on suitable supports above the transformer $d_2$. A set of terminals of the transformer is represented at $d_1$ in Fig. 1.

3. The controllers may of course also be arranged in a case independently of the transformer.

In each detail diagram of Figs. 4–8 the main winding of each phase is shown on the left and the minor winding on the right, or, where two or more minor windings are employed, they are shown successively on the right. In the details of the said diagrams, the connections shown in full lines, in each phase of both sets of windings, between the main winding and the minor winding, or between the main winding and the adjacent minor winding and between the successive minor windings, indicate the insertion of the minor winding or windings into the path of the current of the respective main winding. In the details of the said diagrams the connections shown in broken lines, in each phase of both sets of windings, between the main winding and the minor winding, or between the main winding and the adjacent minor winding and between the successive minor windings, or between the minor windings themselves, indicate the removal of the minor winding or windings from the path of the current of the respective main winding; the said minor winding (or windings), however, always remaining connected in series with the main winding, in each phase. In the details of the said diagrams, the omission of connections, in each phase, indicates the removal of the minor winding (or windings) from the circuit of the current of the respective main winding; but in this case the series connections, in each phase, between the main winding and the minor winding, or between the main winding and the adjacent minor winding and between the successive minor windings, or between the minor windings themselves, are interrupted. The star connection, or the delta connection, of the main winding, or the connection of the main winding and one or more minor windings in a single star or a single delta, is shown, in full lines.

Figure 4:
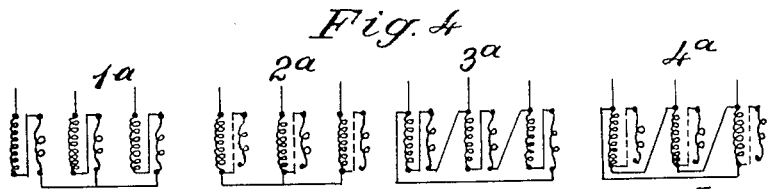
Figure 5:
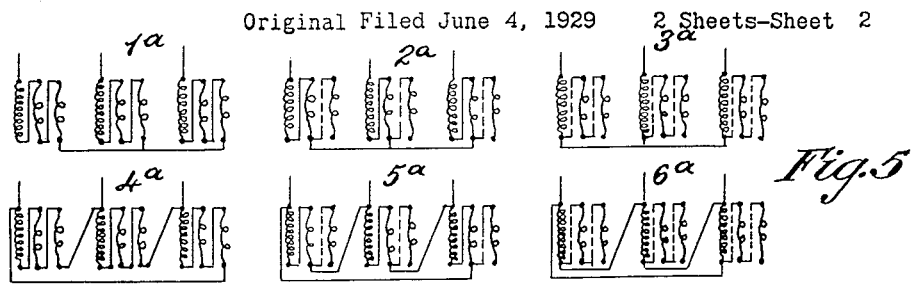
Figure 6:
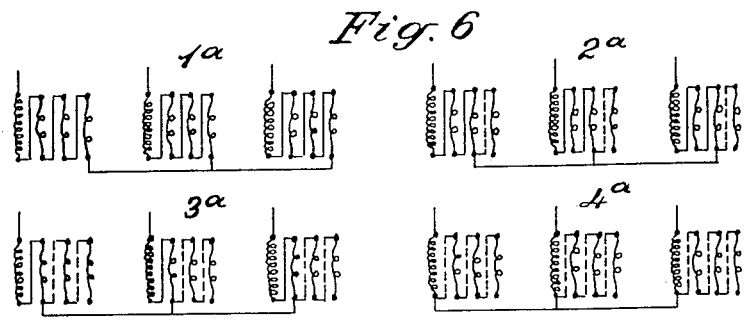
Figure 7:
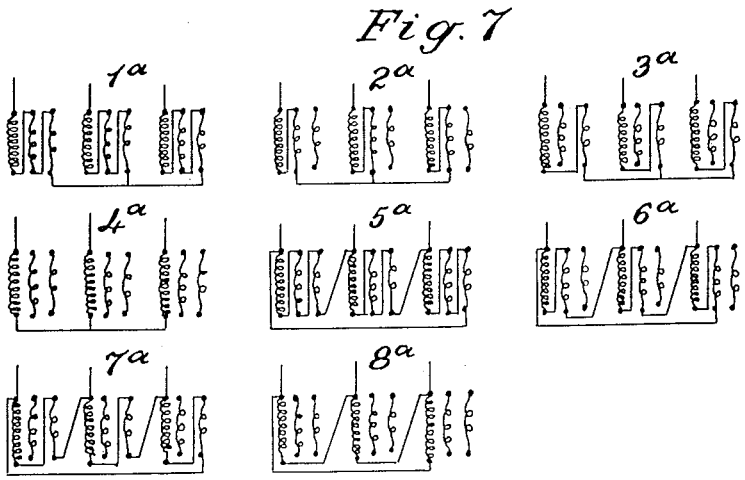
Figure 8:
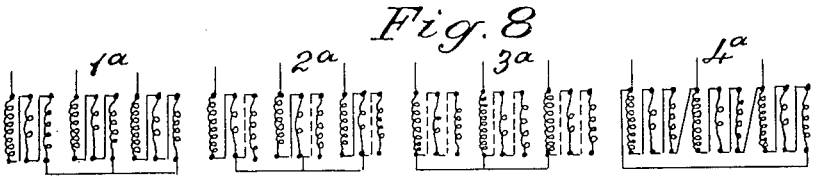

For example in Fig. 4, the main winding and the minor winding of each phase of one set of windings of a three-phase transformer are connected as is shown at 1ª, 2ª, 3ª and 4ª in order to obtain, with like changes of the other set of windings (not shown) three different ranges of power output from the transformer, in addition to the usual rated power output; in Fig. 5 the main winding and the two minor windings of a plurality of windings of a three-phase transformer are connected as is shown at 1ª, 2ª, 3ª, 4ª, 5ª and 6ª to obtain five different ranges of power output, in addition to the usual rated power output of the transformer; in Fig. 6 the main winding and the three minor windings of a plurality of windings of a three-phase transformer are connected as shown at 1ª, 2ª, 3ª and 4ª, to obtain three different ranges of power output as well as the usual rated power output of the transformer; in Fig. 7 the main winding and the two minor windings of a plurality of windings of a three-phase transformer are connected as shown at 1ª, 2ª, 3ª, 4ª, 5ª, 6ª, 7ª and 8ª, to obtain seven different ranges of power output in addition to the usual rated power output of the transformer; while according to Fig. 8, the main winding and the two minor windings of a plurality of windings of a three-phase transformer are connected as shown at 1ª, 2ª, 3ª and 4ª, to obtain three different ranges of power output as well as the usual rated power output of the transformer. According to Fig. 8, however, all the windings of each plurality of windings of the transformer are brought into the path of the corresponding current, when it is desired to obtain the usual rated power output of the said transformer.

The theoretical diagrams (Figs. 1, and 4–8) explained above show clearly how either the insertion, in each phase, both of the plurality of high-voltage windings and of the plurality of low-voltage windings of a transformer, or of one or more minor windings into the path of the current of the main winding, or the removal from each phase, when changing from the delta connection to the star connection, of one or more minor windings from the path of the current through both the plurality of high-voltage windings and the plurality of low-voltage windings of a transformer, produces in either of the aforesaid cases in addition to the usual rated power output, one or more additional ranges of power output in a transformer.

I will now explain two examples of calculation for a three-phase transformer, these calculations referring only to the plurality of low-voltage windings; the plurality of high-voltage windings must of course, for each case, be composed of a corresponding number of windings which must be calculated with respect to the ratio of transformation, and also connected in conformity with those of the plurality of low-voltage windings. In each example the line voltage, on the low-voltage side, is assumed to be 500 volts.

*Example 1.*—For a three-phase transformer, in which the transformer windings are disposed as in Fig. 5, the main winding, composed of three phase-windings, is calculated, with star connection, at normal intensity of magnetization, for a voltage of 865 volts; the first minor winding, composed of three phase-windings, is calculated, with star connection, at normal intensity of magnetization, for a voltage of 190 volts; the second minor winding, composed of three phase-windings, is calculated, with star connection, at normal intensity of magnetization for a voltage of 225 volts. The five different ranges of power output from the transformer, as well as its usual rated power output, represented in Fig. 5 (it being understood that the same connections are established for the separate windings of the other plurality of windings, not shown) are obtained: 1. By the application in 1ª of the line voltage (500 volts) to the main winding and to both minor windings, all of them connected in series with each other in each phase, calculated for a total of 1280 volts on the basis of the normal intensity of magnetization, with connection in a single star; 2. By the application in 2ª of the line voltage (500 volts) to the main winding and to the first minor winding, connected in series with each other in each phase, calculating for a total of 1055 volts on the basis of the normal intensity of magnetization, with connection in a single star; 3. By the application in 3ª of the line voltage (500 volts) to the main winding alone, calculated for 865 volts on the basis of the normal intensity of magnetization, with the usual star connection, for the rated power output for star connection; 4. By the application in 4ª of the line voltage (500 volts) to the main winding and to both minor windings, all of them connected in series with each other, in each phase, calculated for a total of 740 volts on the basis of normal intensity of magnetization, with connection in a single delta; 5. By the application in 5ª of the line voltage (500 volts) to the main winding and to the first minor winding, connected in series with each other in each phase, calculated for a total of 610 volts on the basis of normal intensity of magnetization, with connection in a single delta; 6. And by the application in 6a of the line voltage (500 volts) to the main winding alone, calculated for 500 volts on the basis of normal intensity of magnetization, for the usual rated power output of the trasformer with delta connection. Since the line voltage is 500 volts, the intensity of magnetization for this connection is the intensity which was taken as normal in making the above calculations.

Assumed that this transformer is constructed for 100 kw., which value represents the usual rated power output of the transformer on full load, then the four different ranges of power output in the transformer, with both efficiency and power factor for each range of power output above that of the prior art devices, as well as the usual rated power output of the transformer with star and delta connections, are obtained, approximately, as follows: The first range of power output (1a) for electrical loads from approximately 2 kw. to 20 kw.; the second range of power output (2a) for loads from 10 kw. to 25 kw.; the third range of power output (usual star connection) (3a) for loads from 20 kw. to 33 kw.; the fourth range of power output (4a) for loads from 25 kw. to 65 kw.; the fifth range of power output (5a) for loads from 45 kw. to 85 kw.; and the usual rated power output (6a) (with delta connection) for loads from 75 kw. to 100 kw. The limiting values given above have been selected from practical tests, and are typical.

*Example 2.*—For a three-phase transformer, in which the transformer windings of the plurality of low-voltage windings are disposed as in Fig. 8, the main winding, composed of three phase-windings, is calculated, with star connection, for a voltage of 595 volts on the basis of normal intensity of magnetization; the first minor winding, composed of three phase-windings, is calculated, with star connection, for a voltage of 125 volts on the basis of normal intensity of magnetization; the second minor winding, composed of three phase-windings, is calculated, with star connection, for a voltage of 145 volts on the basis of normal intensity of magnetization. The three different ranges of power output in the transformer as well as the usual rated power output thereof, represented in Fig. 8 (it being understood that the same connections are used between the separate windings of the other plurality of windings, not shown), are obtained: 1. By the application of the line voltage (500 volts) in 1a to the main winding and to both minor windings, all connected in series with each other in each phase, calculated for a total of 865 volts on the basis of normal intensity of magnetization with connection in a single star; 2. By the application in 2a of the line voltage (500 volts) to the main winding and to the first minor winding, connected in series with each other in each phase, calculated for a total of 720 volts on the basis of normal intensity of magnetization, with connection in a single star; 3. By the application in 3a of the line voltage (500 volts) to the main winding alone, calculated for 595 volts on the basis of normal intensity of magnetization, with star connection; and 4. By the application 4a of the line voltage (500 volts) to the main winding and to both minor windings, all connected in series with each other in each phase, calculated for a total of 500 volts on the basis of normal intensity of magnetization, with connection in a single delta. Since case 4 represents the usual rated power output of the transformer, the line voltage of 500 volts will correspond to the normal (maximum) intensity of magnetization in the iron of the same, while in the other three cases, the intensity of magnetization will be successively lower.

Assumed that this transformer is constructed for 100 kw., which value represents the usual rated power output of the transformer on full load, then the three different ranges of power output in the transformer, with both efficiency and power factor for each range of power output above those of the prior art devices, as well as the usual rated power output of the transformer are obtained, approximately, as follows: The first range of power output (1a) (with conventional star connection) for loads from 20 kw. to 33 kw.; the second range of power output (2a) for loads from 25 kw. to 60 kw.; the third range of power output (3a) for loads from 50 kw. to 80 kw.; and the usual rated power output (4a) (with delta connection) for loads from 75 kw. to 100 kw. These limiting values are merely typical.

A transformer conforming to my invention may of course be either step-up or step-down in character, or it may have a one-two-one ratio.

It is obvious that once my invention has been disclosed in its broad aspects, many modifications and adaptations will readily occur to those skilled in the art. Accordingly I intend that my invention be limited only by the scope of the appended claims. This application is a division of my prior application Serial No. 368,254, filed June 4, 1929.

I claim:

1. In a static transformer, of any number of phases, for converting alternating currents from one voltage to another, means for producing values of magnetic flux, each best adapted to a particular range of load of the transformer, for a number of different arbitrarily chosen ranges of load of the transformer, and for maintaining the power factor and efficiency approximately constant over said ranges during the functioning of the transformer, said means comprising, for both the high-voltage system of windings and for the low-voltage system of windings, an ensemble of windings for each phase, all of the windings of each system and of each ensemble, for each phase, both high-voltage and low-voltage, being disposed in the same manner with respect to the magnetic field of the transformer, each of said ensembles of windings comprising a principal winding and at least one minor winding, means for making the connections of the high-voltage windings, and means for making the connections of the low-voltage windings, by which connection means the number of minor windings, in each ensemble, in the current circuit of each principal winding, both high-voltage and low-voltage, may be changed, for the purpose of obtaining, besides the usual range of load, further or additional arbitrarily chosen ranges of load of the transformer.

2. In a three-phase static transformer, for converting alternating currents from one voltage to another, means for producing values of magnetic flux, each best adapted to a particular range of load of the transformer, for a number of different arbitrarily chosen ranges of load of the transformer, and for maintaining the power factor and efficiency approximately constant over said ranges during the functioning of the transformer, said means comprising, for both the high-voltage system of windings and for the low-voltage system of windings, an ensemble of windings for each phase, all of the windings of each system and of each ensemble, for each phase, both high-voltage and low-voltage, being disposed in the same manner with respect to the magnetic field of the transformer, in which transformer each of said ensembles of windings comprises a principal winding and at least one minor winding, means for making the connections of the high-voltage windings, and means for making the connections of the low-voltage windings, by which connection means at least one minor winding of each phase may be cut out of the current circuit of each principal winding, both high-voltage and low-voltage, for the purpose of obtaining, besides the usual ranges of load, further or additional arbitrarily chosen ranges of load of the transformer.

3. In a three-phase static transformer, for converting alternating currents from one voltage to another, means for producing values of magnetic flux, each best adapted to a particular range of load of the transformer, for a number of different arbitrarily chosen ranges of load of the transformer, and for maintaining the power factor and efficiency approximately constant over said ranges during the functioning of the transformer, said means comprising, for both the high-voltage system of windings and for the low-voltage system of windings, an ensemble of windings for each phase, all of the windings of each system and of each ensemble, for each phase, both high-voltage and low-voltage, being disposed in the same manner with respect to the magnetic field of the transformer, all of the windings of each ensemble being permanently connected together in series with each other at junction points, in each phase, both high-voltage and low-voltage, in which transformer each of said ensembles of windings comprises a principal winding and at least one minor winding, tap wires connected to said junction points, means for making the connections of the high-voltage windings, and means for making the connections of the low-voltage windings, by which connection means, coacting with said tap wires, at least one minor winding of each phase may be cut out of the path of the current of each principal winding, both high-voltage and low-voltage, for the purpose of obtaining, besides the usual ranges of load, further or additional arbitrarily chosen ranges of load of the transformer.

4. In a static transformer, of any number of phases, for converting alternating currents from one voltage to another, means for producing values of magnetic flux, each best adapted to a particular range of load of the transformer, for a number of different arbitrarily chosen ranges of load of the transformer, and for maintaining the power factor and efficiency approximately constant over said ranges during the functioning of the transformer, said means comprising, for both the high-voltage system of windings and for the low-voltage system of windings, an ensemble of windings for each phase, all of the windings of each system and of each ensemble, for each phase, both high-voltage and low-voltage, being disposed in the same manner with respect to the magnetic field of the transformer, in which transformer each of said ensembles of windings comprises a principal winding dimensioned for the usual maximum load of the transformer and at least one minor winding, means for making the connections of the high voltage windings, and means for making the connections of the low-voltage windings, by which connection means at least one minor winding of each phase may be inserted into the current circuit of each principal winding, both high-voltage and low-voltage, for the purpose of obtaining, besides the usual ranges of load, further or additional arbitrarily chosen ranges of load of the transformer.

5. In a static transformer, of any number of phases, for converting alternating currents from one voltage to another, means for producing values of magnetic flux, each best adapted to a particular range of load of the transformer, for a number of different arbitrarily chosen ranges of load of the transformer, and for maintaining the power factor and efficiency approximately constant over said ranges during the functioning of the transformer, said means comprising, for both the high-voltage system of windings and for the low-voltage system of windings, an ensemble of windings for each phase, all of the windings of each system and of each ensemble, for each phase, both high-voltage and low-voltage, being disposed in the same manner with respect to the magnetic field of the transformer, all of the windings of each ensemble being permanently connected together in series with each other at junction points, in each phase, both high-voltage and low-voltage, in which transformer each of said ensembles of windings comprises a principal winding dimensioned for the usual maximum load of the transformer and at least one minor winding, tap wires connected to said junction points, means for making the connections of the high-voltage windings, and means for making the connections of the low-voltage windings, by which connection means, coacting with said tap wires, at least one minor winding of each phase may be inserted into the path of the current of each principal winding, both high-voltage and low-voltage, for the purpose of obtaining, besides the usual ranges of load, further or additional arbitrarily chosen ranges of load of the transformer.

GIOVANNI PEDRAZZO.